United States Patent
Nishimoto et al.

(10) Patent No.: US 9,195,028 B2
(45) Date of Patent: Nov. 24, 2015

(54) OPTICAL ELEMENT, IMAGING LENS UNIT, IMAGE PICKUP APPARATUS

(75) Inventors: Masashi Nishimoto, Kanagawa (JP); Hideaki Okano, Aichi (JP); Takahiro Tomaru, Aichi (JP)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 13/571,606

(22) Filed: Aug. 10, 2012

(65) Prior Publication Data

US 2013/0076971 A1    Mar. 28, 2013

(30) Foreign Application Priority Data

Sep. 26, 2011    (JP) .................. 2011-208346

(51) Int. Cl.
*H04N 5/225*  (2006.01)
*G02B 13/00*  (2006.01)
*G02B 7/02*  (2006.01)
*G02B 3/00*  (2006.01)

(52) U.S. Cl.
CPC ............. *G02B 13/004* (2013.01); *G02B 3/00* (2013.01); *G02B 7/02* (2013.01); *G02B 7/021* (2013.01); *H04N 5/2254* (2013.01)

(58) Field of Classification Search
CPC ...... H04N 5/2254; G02B 13/004; G02B 7/02; G02B 3/00; G02B 7/021
USPC .................................. 348/340, 360
See application file for complete search history.

(56) References Cited

U.S. PATENT DOCUMENTS

| 9,069,119 | B2* | 6/2015 | Takase et al. ................. 1/1 |
| 2003/0193605 | A1* | 10/2003 | Yamaguchi .................. 348/335 |
| 2004/0012861 | A1* | 1/2004 | Yamaguchi .................. 359/772 |
| 2005/0068456 | A1* | 3/2005 | Ohta et al. .................. 348/360 |
| 2005/0123238 | A1* | 6/2005 | Ito .................................. 385/33 |
| 2005/0195501 | A1* | 9/2005 | Sato ............................. 359/738 |
| 2005/0219717 | A1* | 10/2005 | Uehira et al. ............... 359/793 |
| 2005/0264671 | A1* | 12/2005 | Isono et al. .................. 348/335 |
| 2006/0056042 | A1* | 3/2006 | Kim et al. .................... 359/666 |
| 2006/0066748 | A1* | 3/2006 | Isono ........................... 348/360 |
| 2006/0114344 | A1* | 6/2006 | Kyong et al. ................ 348/296 |
| 2007/0047938 | A1* | 3/2007 | Suzuki et al. ................. 396/89 |

(Continued)

FOREIGN PATENT DOCUMENTS

| JP | 2005-309289 A | 11/2005 |
| JP | 2008-090150 A | 4/2008 |
| JP | 2009-080330 A | 4/2009 |

(Continued)

OTHER PUBLICATIONS

Chinese Office Action in connection with the Japanese Patent Application No. 2011-208346, issued Aug. 4, 2015.

*Primary Examiner* — Nicholas Giles
*Assistant Examiner* — Abdelaaziz Tissire
(74) *Attorney, Agent, or Firm* — Hazuki International, LLC

(57) ABSTRACT

An optical element includes an effective diameter area that is centered on an optical axis and transmits an effective light beam, and a flange portion having, on a side surface around the effective diameter area, a slope that is not perpendicular to a direction of the optical axis.

18 Claims, 14 Drawing Sheets

(56) References Cited

U.S. PATENT DOCUMENTS

| | | | |
|---|---|---|---|
| 2010/0046090 A1* | 2/2010 | Okano | 359/715 |
| 2010/0176281 A1* | 7/2010 | Tomioka et al. | 250/227.2 |
| 2010/0177238 A1* | 7/2010 | Saito | 348/374 |
| 2010/0309368 A1* | 12/2010 | Choi et al. | 348/360 |
| 2011/0025903 A1* | 2/2011 | Naoi | 348/340 |
| 2011/0134303 A1* | 6/2011 | Jung et al. | 348/340 |
| 2011/0273611 A1* | 11/2011 | Matsusaka et al. | 348/345 |

FOREIGN PATENT DOCUMENTS

| | | |
|---|---|---|
| JP | 2009-092797 A | 4/2009 |
| JP | 2009-216956 A | 9/2009 |
| JP | 2009-288300 A | 12/2009 |
| JP | 2010-009028 A | 1/2010 |
| JP | 2010-072622 A | 4/2010 |
| JP | 2010-164755 A | 7/2010 |
| WO | 2011004467 A1 | 1/2011 |

\* cited by examiner

OPTICAL ELEMENT, IMAGING LENS UNIT, IMAGE PICKUP APPARATUS

BACKGROUND

The present technology relates to an optical element. More specifically, the present technology relates to the shapes of lenses in an imaging lens unit and to an image pickup apparatus using the lenses.

Image pickup apparatuses using a solid-state image pickup device such as a CCD or CMOS sensor, for example, camera-equipped mobile telephones or digital still cameras, have been used. There has been a demand to reduce the size and thickness of such an image pickup apparatus and the size and length of an imaging lens included in the image pickup apparatus.

In recent years, compact image pickup apparatuses, such as camera-equipped mobile telephones, have been decreased in size and increased in number of pixels of an image pickup device. Models including a high-pixel-count image pickup device having a large number of pixels equivalent to those of a digital still camera have become popularized. Accordingly, the image pickup apparatus includes an imaging lens having high lens performance corresponding to such a high-pixel-count solid-state image pickup device.

Further, a ghost or flare is a factor in image degradation, and therefore, it is desirable to provide an imaging optical system that does not cause a ghost or flare. However, a ghost or flare has become more likely to occur with recent reduction in size and thickness, and is difficult to remove.

Accordingly, for example, Japanese Unexamined Patent Application Publication No. 2010-164755 proposes an optical element that suppresses the occurrence of a ghost or flare by providing an outer peripheral surface (edge surface) of a second lens with a non-parallel face that is not parallel to the optical axis.

SUMMARY

The above-described related art is effective when harmful light is incident on the edge surface, but does not remove a ghost in an optical system in which the radius of curvature of an image-side effective diameter area is small such that harmful light is reflected toward an object-side flange surface. Further, in an optical system having a convex surface on the image side, a light beam totally reflected by an image-side flange surface does not impinge on the non-parallel face on the edge surface. Therefore, it is difficult to remove a ghost or flare when the light is reflected toward the object-side flange surface.

Accordingly, it is desirable to effectively suppress the occurrence of a ghost or flare in an optical element corresponding to a high-pixel-count image pickup device.

According to a first embodiment of the present technology, there is provided an optical element including an effective diameter area that is centered on an optical axis and transmits an effective light beam, and a flange portion having, on a side surface around the effective diameter area, a slope that is not perpendicular to a direction of the optical axis. Thus, the reflection angle of a light beam incident on the side surface of the flange portion is changed by the slope so as to prevent a harmful light beam from entering an image pickup device.

In the first embodiment, the side surface on which the slope is provided may be an image-side side surface of the flange portion. The slope may be provided in an inner edge portion or an outer edge portion of the side surface of the flange portion. The slope may include recesses provided in the inner edge portion and the outer edge portion of the side surface of the flange portion, and an area connecting the recesses in the inner edge portion and the outer edge portion may be a flat surface substantially perpendicular to the optical axis. The slope may be provided along the entirety or a part of a circumference of a circle centered on the optical axis on the side surface of the flange portion.

According to a second embodiment of the present technology, there is provided an imaging lens unit including, in order from an object side, a first lens having a positive refractive power, a second lens having a negative refractive power, a third lens having a positive refractive power, and a fourth lens having a negative refractive power. The second lens or the third lens has an effective diameter area that is centered on an optical axis and transmits an effective light beam, and a flange portion having, on a side surface around the effective diameter area, a slope that is not perpendicular to a direction of the optical axis. Thus, in the second lens or the third lens in the lens unit including the four lenses, the reflection angle of a light beam incident on the side surface of the flange portion is changed by the slope so as to prevent a harmful light beam from entering an image pickup device. The imaging lens unit may further include a lens that does substantially not have a lens power.

According to a third embodiment of the present technology, there is provided an imaging lens unit including, in order from an object side, a first lens having a positive refractive power, a second lens having a negative refractive power, a third lens having a positive refractive power, a fourth lens having a positive refractive power, and a fifth lens having a negative refractive power. The second lens or the third lens has an effective diameter area that is centered on an optical axis and transmits an effective light beam, and a flange portion having, on a side surface around the effective diameter area, a slope that is not perpendicular to a direction of the optical axis. Thus, in the second lens or the third lens in the lens unit including the five lenses, the reflection angle of a light beam incident on the side surface of the flange portion is changed by the slope so as to prevent a harmful light beam from entering an image pickup device. The imaging lens unit may further include a lens that does substantially not have a lens power.

According to a fourth embodiment of the present technology, there is provided an image pickup apparatus including an imaging lens unit including, in order from an object side, a first lens having a positive refractive power, a second lens having a negative refractive power, a third lens having a positive refractive power, and a fourth lens having a negative refractive power, and an image pickup device that converts an optical image formed by the imaging lens unit into an electrical signal. The second lens or the third lens has an effective diameter area that is centered on an optical axis and transmits an effective light beam, and a flange portion having, on a side surface around the effective diameter area, a slope that is not perpendicular to a direction of the optical axis. Thus, in the image pickup apparatus including the imaging lens unit, the reflection angle of a light beam incident on the side surface of the flange portion is changed by the slope so as to prevent a harmful light beam from entering an image pickup device. The imaging lens unit may further include a lens that does substantially not have a lens power.

According to the present technology, in the optical element corresponding to a high-pixel-count image pickup device, the occurrence of a ghost or flare can be suppressed effectively.

DETAILED DESCRIPTION OF EMBODIMENTS

Figure 1:
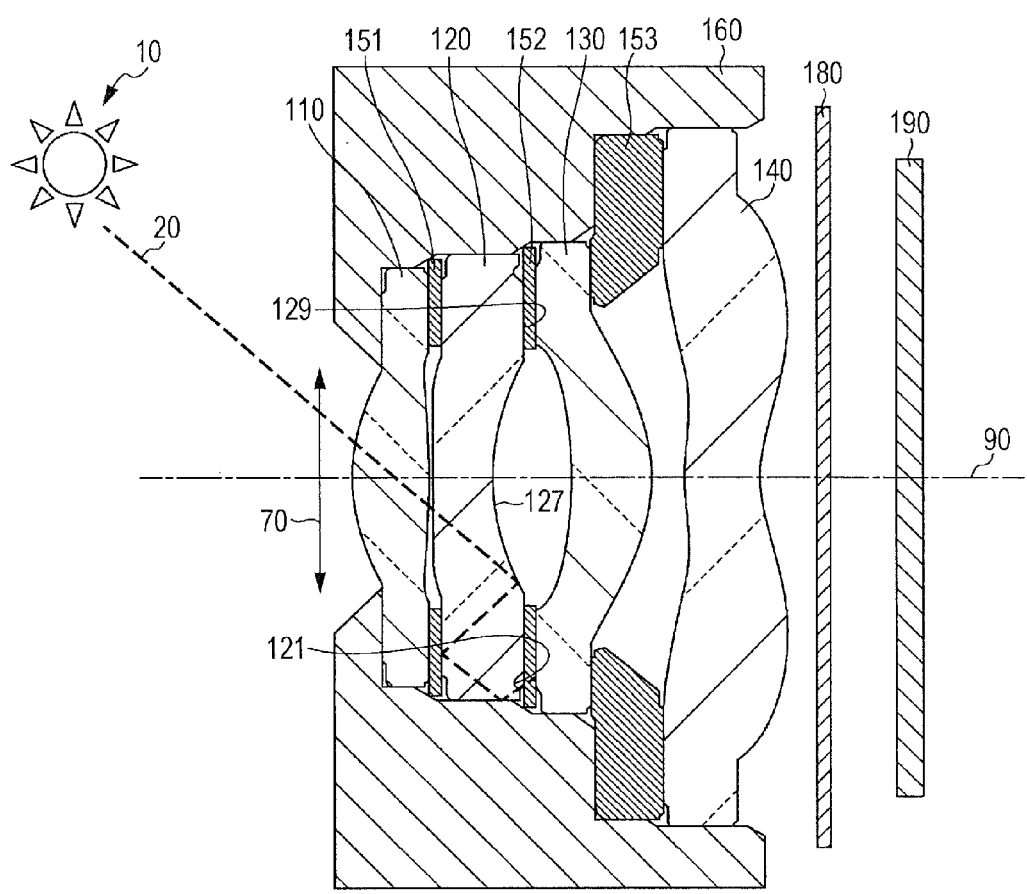
FIG. 1 is an exemplary cross-sectional view illustrating the relationship between an optical system and incident light in an image pickup apparatus according to a first embodiment of the present technology.

Embodiments of the present technology will be described below in the following order:
1. First embodiment (an example in which a recess is provided in an outer edge portion of an image-side flange surface of a second lens)
2. Second embodiment (an example in which a recess is provided in an inner edge portion of an image-side flange surface of a second lens)
3. Third embodiment (an example in which recesses are provided in an outer edge portion and an inner edge portion of an image-side flange surface of a second lens)
4. Fourth embodiment (another example in which recesses are provided in an outer edge portion and an inner edge portion of an image-side flange surface of a second lens)
5. Fifth embodiment (an example in which a recess is provided in an inner edge portion of an image-side flange surface of a third lens)
6. Modifications 1. First Embodiment
Configuration of Optical System in Image Pickup Apparatus FIG. 1 is an exemplary cross-sectional view illustrating the relationship between an optical system and incident light in an image pickup apparatus according to a first embodiment of the present technology. The optical system of the first embodiment includes a first lens 110 having a positive refractive power, a second lens 120 having a negative refractive power, a third lens 130 having a positive refractive power, and a fourth lens 140 having a negative refractive power. Hereinafter, each of the first lens 110 to the fourth lens 140 is sometimes simply referred to as a "lens." Each lens has an effective diameter area corresponding to an effective diameter 70 that is centered on an optical axis 90 and transmits an effective light beam. A portion around the effective diameter area in the lens is referred to as a flange portion. A side surface of the flange portion facing an object side is referred to as an object-side flange surface, and a side surface of the flange portion facing an image side is referred to as an image-side flange surface. Further, an outer peripheral edge surface of the lens is referred to as an edge surface.

Light-shielding members 151 to 153 are provided between the flange portions of the four lenses 110 to 140. The light-shielding members 151 and 153 are doughnut-shaped, and block light so that the light does not pass through areas other than the effective diameter areas of the lenses.

The lenses 110 to 140 and the light-shielding members 151 to 153 are stored in a lens holder 160. The lens holder 160 is also referred to as a lens barrel.

On an image side of the lenses 110 to 140, a filter 180 is provided to cut extra infrared light.

On an image side of the filter 180, an image pickup device 190 is provided to convert an optical image formed by the lenses 110 to 140, which are arranged in this order from the object side, into electrical signals.

Figure 14:
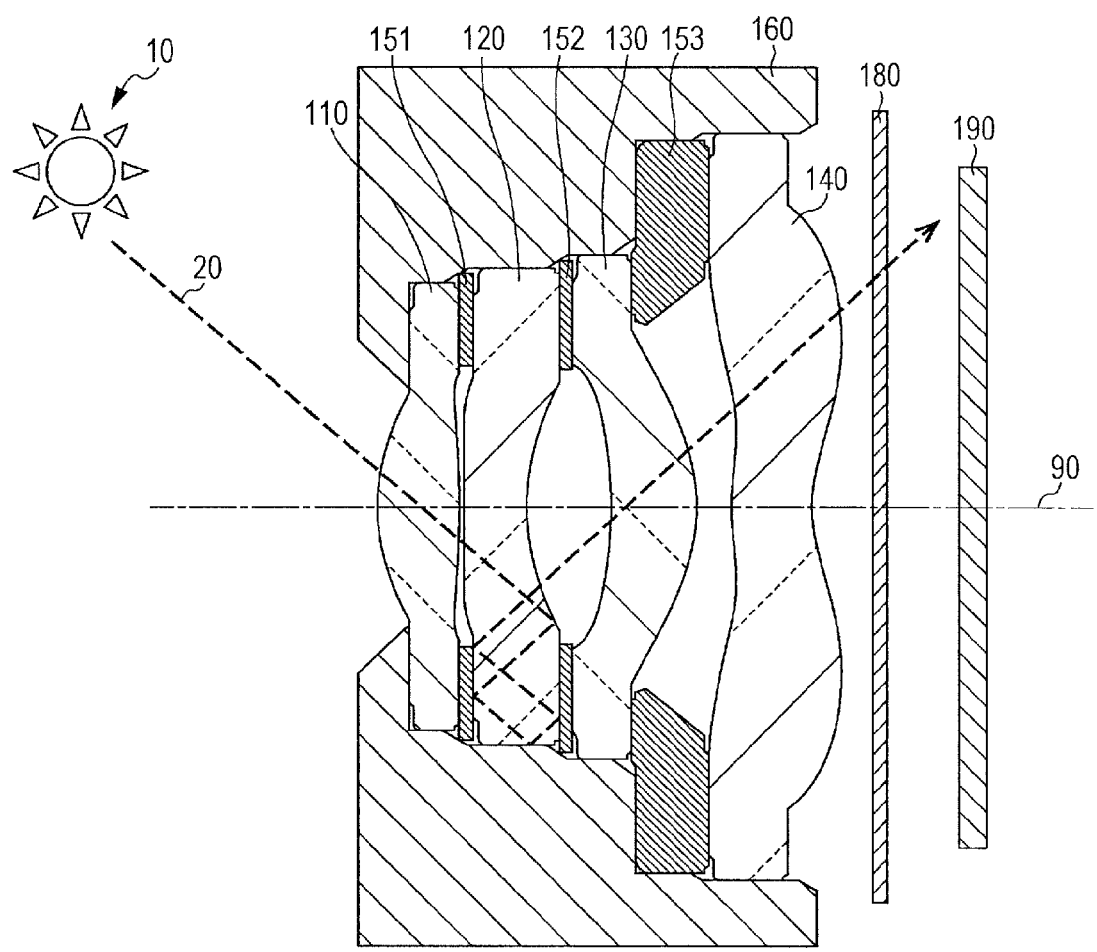
FIG. 14 is an exemplary cross-sectional view illustrating the relationship between an optical system and incident light in an image pickup apparatus of the related art.
Figure 15:
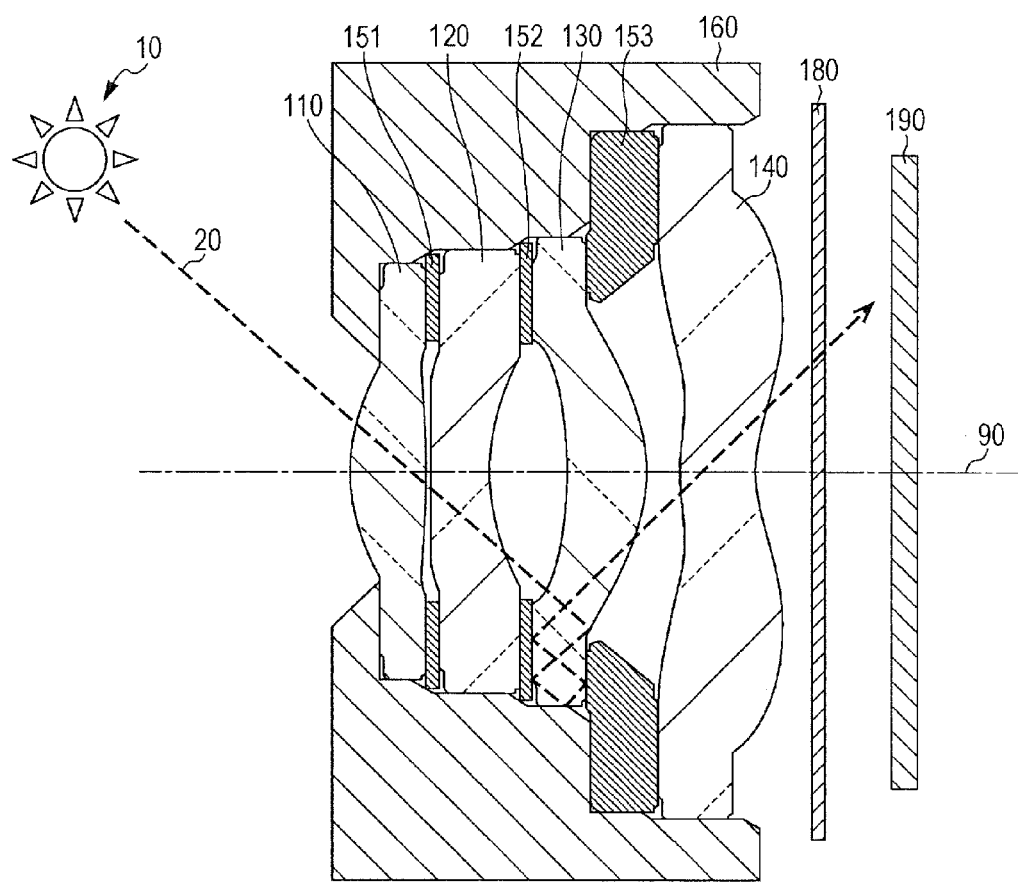
FIG. 15 is another exemplary cross-sectional view illustrating the relationship between the optical system and incident light in the image pickup apparatus of the related art.

In such a four-lens structure, for example, as illustrated in FIG. 14, a beam of incident light 20 from a light source 10 may be reflected from the image side of the effective diameter area of the second lens 120 toward the object-side flange surface and may repeat reflection in the second lens 120. When such a beam enters the image pickup device 190 after repeating reflection in the second lens 120, it causes a ghost or flare. Accordingly, in the first embodiment, as illustrated in FIG. 1, a recess 121 is provided in an outer edge portion of an image-side flange surface 129 of the second lens 120 so that a harmful light beam incident from an image-side effective diameter area 127 is refracted toward the lens holder 160 and the light-shielding member 152. As a result, the harmful light beam that may cause a ghost or flare is prevented from entering the image pickup device 190.

Figure 2:
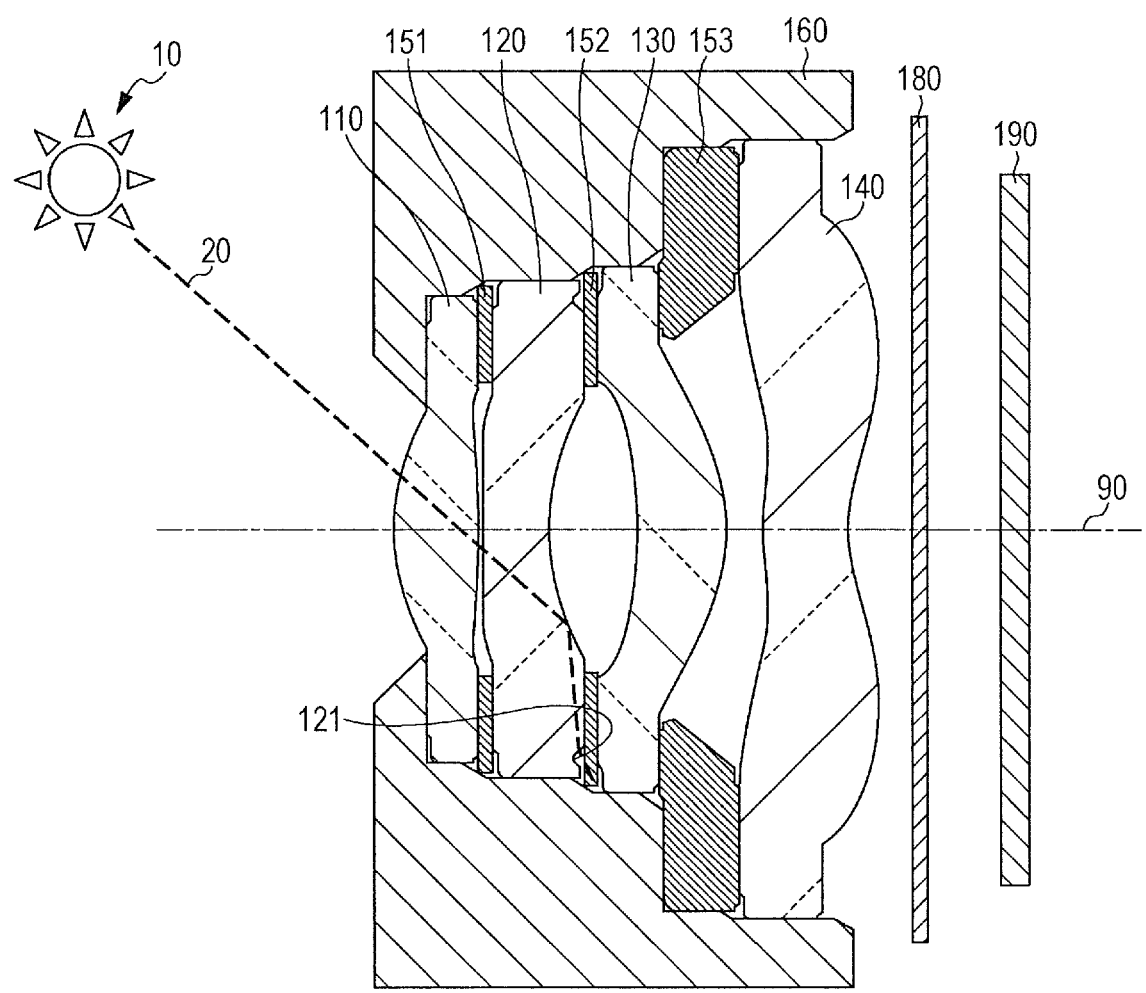
FIG. 2 is another cross-sectional view illustrating the relationship between the optical system and incident light in the image pickup apparatus of the first embodiment.

FIG. 2 is another exemplary cross-sectional view illustrating the relationship between the optical system and incident light in the image pickup apparatus according to the first embodiment of the present technology. The optical system of FIG. 2 is similar to the optical system of FIG. 1 except in the incident angle of incident light 20. In this example, if the recess 121 is not provided, a beam of incident light 20 from the light source 10 may be reflected from the image side of the effective diameter area of the second lens 120 toward the object-side flange surface and may repeat reflection in the second lens 120. When such a light beam enters the image pickup device 190 after repeating reflection in the second lens 120, it similarly causes a ghost or flare. Accordingly, in the first embodiment of the present technology, the recess 121 is provided in the outer edge portion of the image-side flange surface 129 of the second lens 120 so that the light beam incident at such an angle is refracted toward the light-shielding member 152, as illustrated in FIG. 2. As a result, a harmful light beam that may cause a ghost or flare can be prevented from entering the image pickup device 190.

Structure of Second Lens

Figure 3:
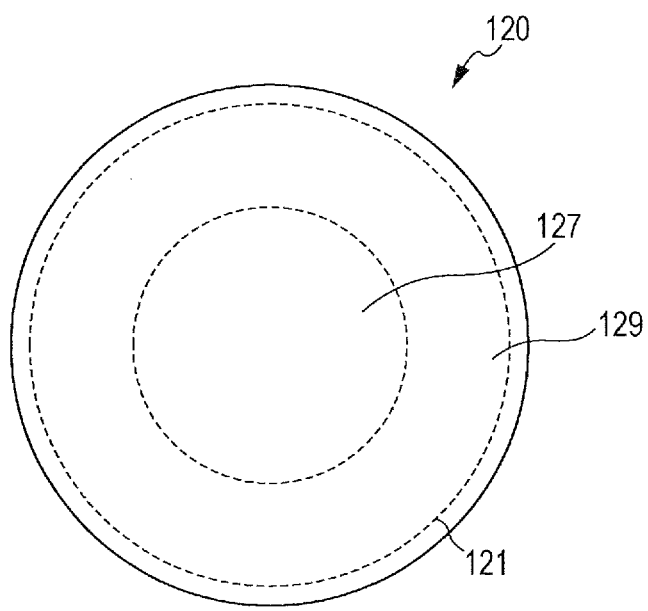
FIG. 3 is an exemplary rear view of a second lens in the first embodiment, as viewed in an optical axis direction from an image side.

FIG. 3 is an exemplary rear view of the second lens 120 of the first embodiment of the present technology, as viewed in the optical axis direction from the image side. In the second lens 120 of the first embodiment, the recess 121 is provided in the outer edge portion of the image-side flange surface 129 around the image-side effective diameter area 127. The recess 121 is provided along the entire circumference of a circle centered on the optical axis 90 in the outer edge portion of the image-side flange surface 129.

While the recess 121 is provided along the entire circumference of the circle centered on the optical axis 90 in the first embodiment, it may be provided only along a part of the circle centered on the optical axis 90. For example, the recess 121 may be provided only along a lower half of the circle centered on the optical axis 90, in consideration of incidence of the harmful light beam from an upper side to a lower side.

Figure 4A:
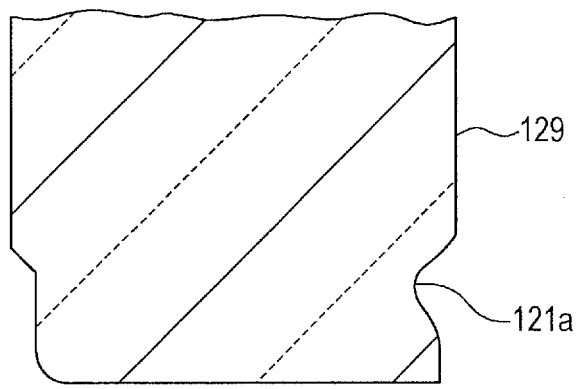
FIGS. 4A, 4B, and 4C are exemplary cross-sectional views of recesses provided in the second lens of the first embodiment.
Figure 4B:
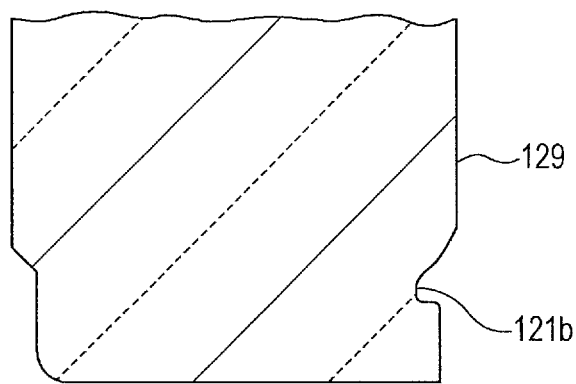
Figure 4C:
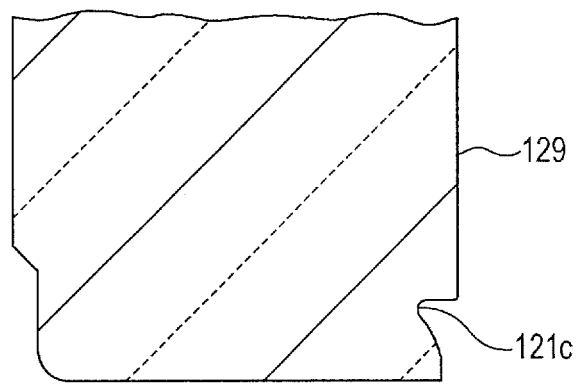

FIGS. 4A to 4C are exemplary enlarged cross-sectional views of the recess 121 provided in the second lens 120 of the first embodiment of the present technology. FIGS. 4A, 4B, and 4C illustrate examples of recesses 121 having different shapes, that is, a recess 121a, a recess 121b, and a recess 121c, respectively.

The recess 121a has slopes that are not perpendicular to the direction of the optical axis 90, on both an inner peripheral side and an outer peripheral side of the second lens 120. The recess 121b has a slope that is not perpendicular to the direction of the optical axis 90 only on the inner peripheral side of the second lens 120. The recess 121c has a slope that is not perpendicular to the direction of the optical axis 90 only on the outer peripheral side of the second lens 120. By changing the reflection angle of the light beam in the second lens 120 by these slopes, repetition of reflection in the second lens 120 can be suppressed.

As described above, in the first embodiment of the present technology, a harmful light beam that may cause a ghost or flare can be prevented from entering the image pickup device 190 by forming the recess 121 in the outer edge portion of the image-side flange surface 129 of the second lens 120. That is, a harmful light beam, which is reflected by the image-side effective diameter area and the object-side flange surface, is refracted toward the lens holder 160 or the light-shielding member 152 by the recess 121 so as not to enter the image pickup device 190. Further, a harmful light beam, which is reflected by the image-side effective diameter area, the object-side flange surface, and the lens edge surface, is refracted toward the light-shielding member 152 so as not to enter the image pickup device 190. In addition, when a light beam reflected by the image-side effective diameter area directly travels toward the lens edge surface, it is refracted toward the lens holder 160 or the light-shielding member 152 by the recess 121 so as not to enter the image pickup device 190.

2. Second Embodiment

Configuration of Optical System in Image Pickup Apparatus

Figure 5:
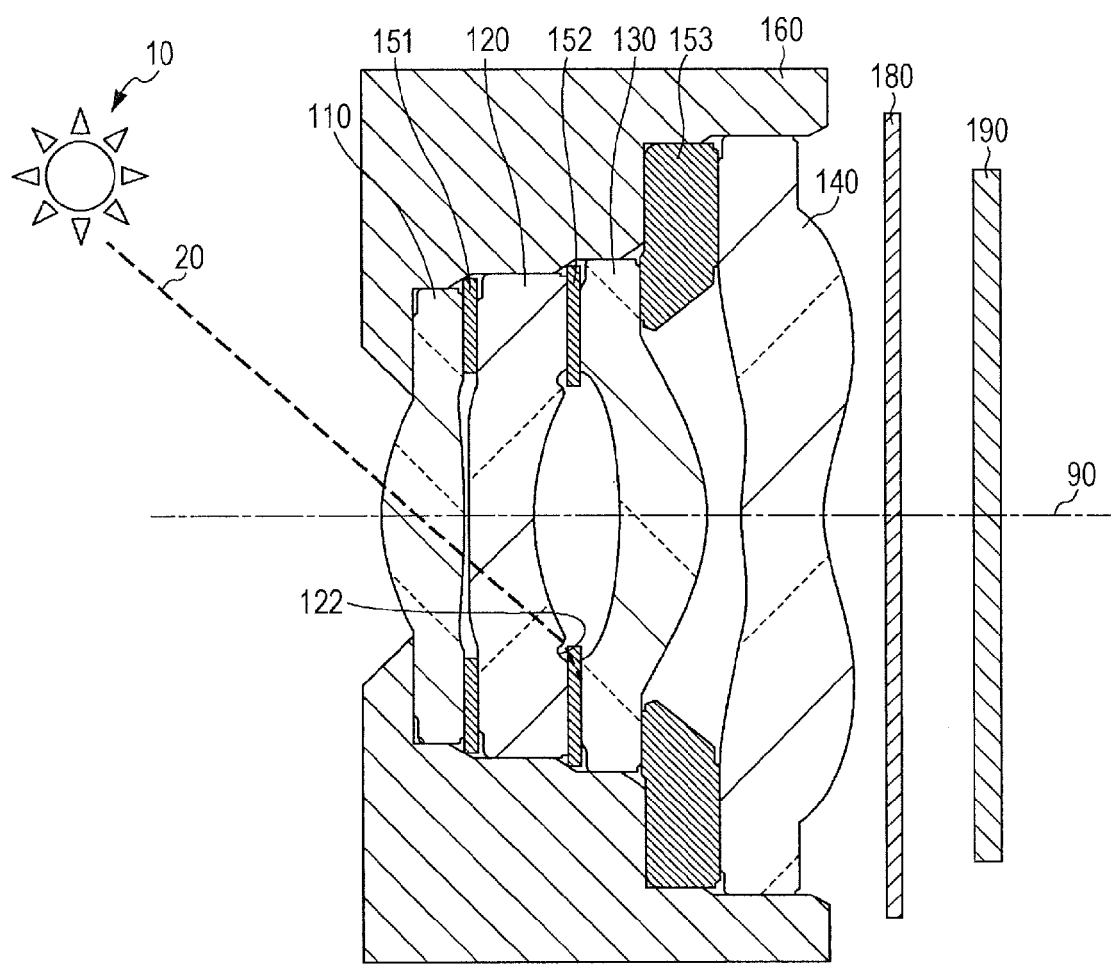
FIG. 5 is an exemplary cross-sectional view illustrating the relationship between an optical system and incident light in an image pickup apparatus according to a second embodiment of the present technology.

FIG. 5 is an exemplary cross-sectional view illustrating the relationship between an optical system and incident light in an image pickup apparatus according to a second embodiment of the present technology. Similarly to the first embodiment, the optical system of the second embodiment includes a first lens 110 having a positive refractive power, a second lens 120 having a negative refractive power, a third lens 130 having a positive refractive power, and a fourth lens 140 having a negative refractive power. Also, similarly to the first embodiment, the optical system of the second embodiment further includes light-shielding members 151 to 153, a lens holder 160, a filter 180, and an image pickup device 190.

While the recess 121 is provided in the outer edge portion of the image-side flange surface 129 of the second lens 120 in the first embodiment, a recess 122 is provided in an inner edge portion of an image-side flange surface 129 of the second lens 120 in the second embodiment. The recess 122 refracts a light beam incident on the inner edge portion of the image-side flange surface 129 of the second lens 120 toward the light-shielding member 152 without reflection. As a result, it is possible to prevent a harmful light beam that may cause a ghost or flare from entering the image pickup device 190.

Figure 6:
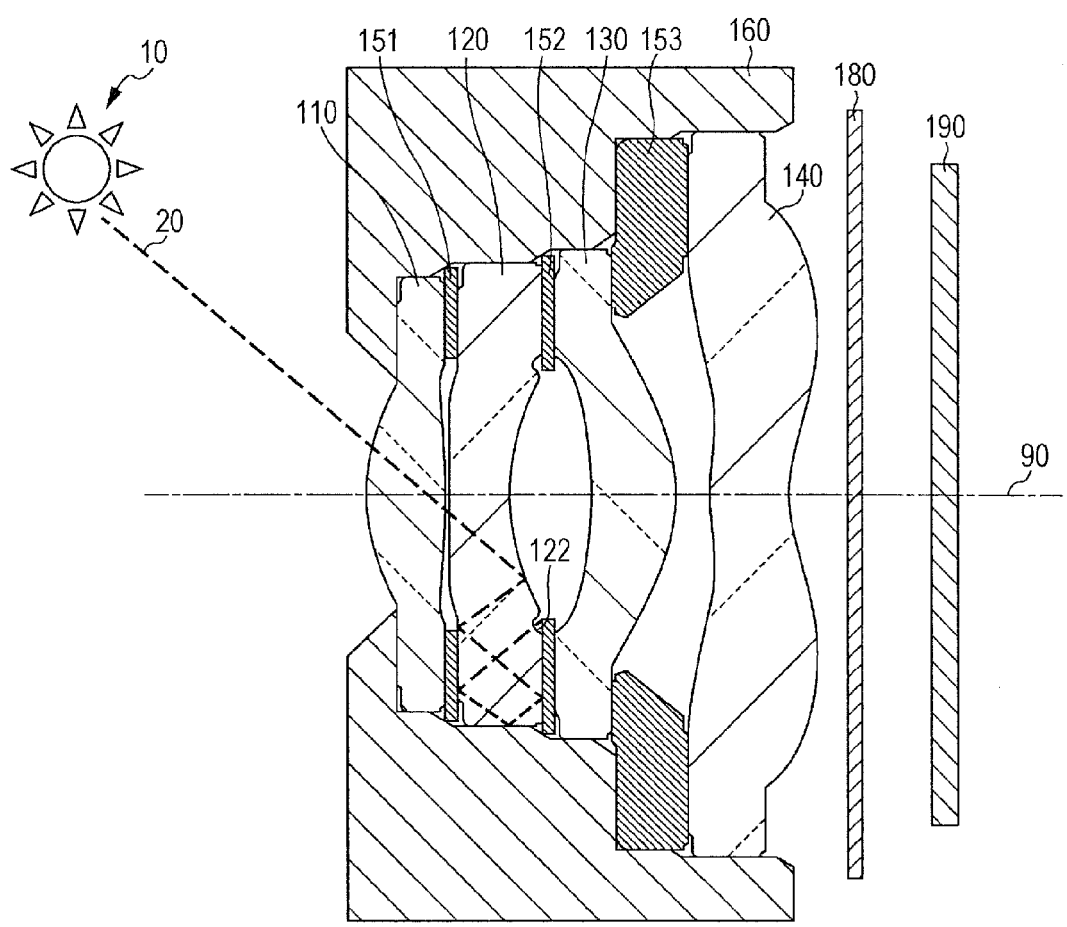
FIG. 6 is another exemplary cross-sectional view illustrating the relationship between the optical system and incident light in the image pickup apparatus of the second embodiment.

FIG. 6 is another exemplary cross-sectional view illustrating the relationship between the optical system and incident light in the image pickup apparatus of the second embodiment of the present technology. The optical system in the image pickup apparatus of FIG. 6 is similar to that of FIG. 5 except in the incident angle of incident light 20. In this example, after a light beam incident on the inner edge portion of the image-side flange surface 129 of the second lens 120 repeats reflection in the second lens 120, it is refracted toward the light-shielding member 152 by the recess 122 immediately before being further reflected by the inner edge portion. As a result, it is possible to prevent a harmful light beam that may cause a ghost or flare from entering the image pickup device 190.

Structure of Second Lens

Figure 7:
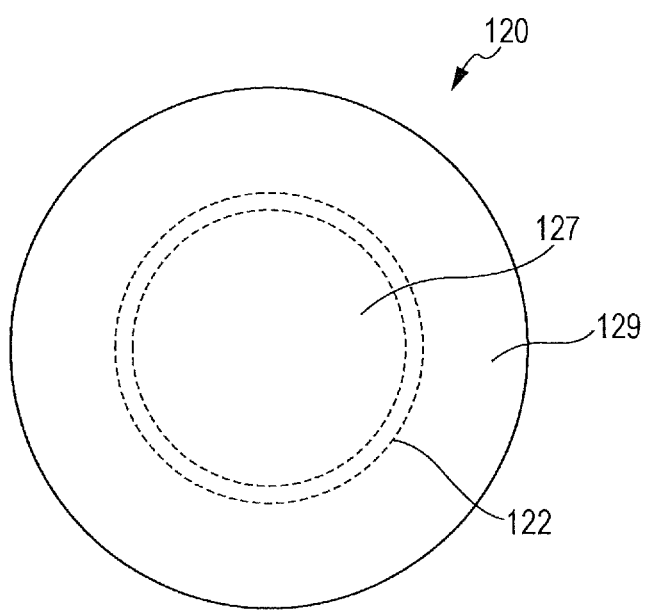
FIG. 7 is an exemplary rear view of a second lens in the second embodiment, as viewed in an optical axis direction from an image side.

FIG. 7 is an exemplary rear view of the second lens 120 of the second embodiment of the present technology, as viewed in the optical axis direction from the image side. The second lens 120 of the second embodiment has the recess 122 provided in the inner edge portion of the image-side flange surface 129 around an image-side effective diameter area 127. The recess 122 is provided along the entire circumference of a circle centered on the optical axis 90 in the inner edge portion of the image-side flange surface 129.

While the recess 122 is provided along the entire circumference of the circle centered on the optical axis 90 in the second embodiment, it may be provided along only a part of the circle centered on the optical axis 90, similarly to the first embodiment. For example, the recess 122 may be provided along a lower half of the circle centered on the optical axis 90, in consideration of incidence of a harmful light beam from an upper side to a lower side.

Further, the recess 122 may have shapes similar to the shapes of the first embodiment illustrated in FIGS. 4A to 4C.

As described above, in the second embodiment of the present technology, the recess 122 is provided in the inner edge portion of the image-side flange surface 129 of the second lens 120. This prevents a harmful light beam that may cause a ghost or flare from entering the image pickup device 190. That is, a harmful light beam totally reflected by the image-side effective diameter area is refracted toward the light-shielding member 152 so as not to enter the image pickup device 190. Further, a harmful light beam, which repeats total reflection on the image-side effective diameter area, the object-side flange surface, the lens edge surface, the image-side flange surface, and the object-side flange surface, is refracted toward the light-shielding member 152 so as not to enter the image pickup device 190. In addition, a harmful light beam, which repeats total reflection on the image-side effective diameter area, the lens edge surface, and the object-side flange surface, is refracted toward the light-shielding member 152 so as not to enter the image pickup device 190.

3. Third Embodiment

Configuration of Optical System in Image Pickup Apparatus

Figure 8:
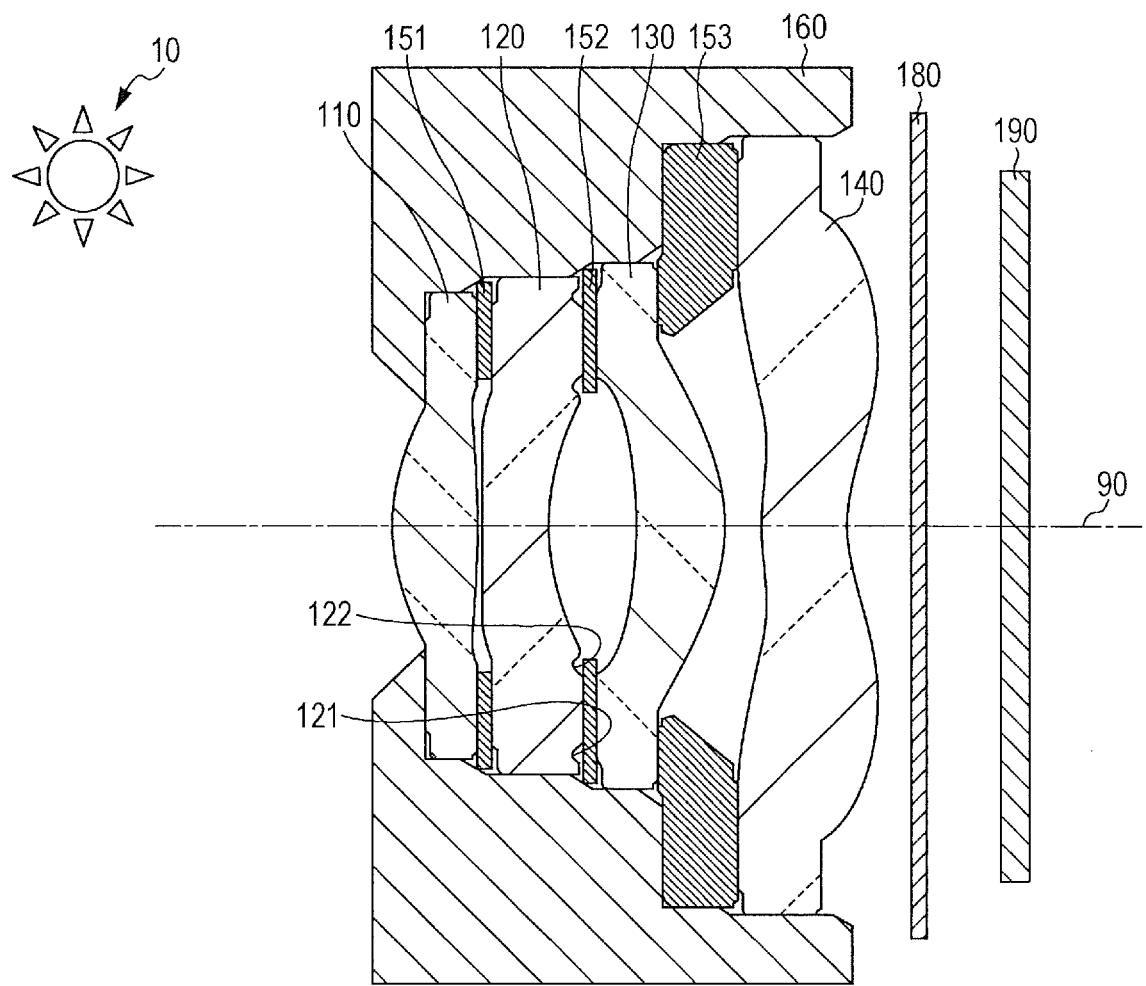
FIG. 8 is an exemplary cross-sectional view illustrating the relationship between an optical system and incident light in an image pickup apparatus according to a third embodiment of the present technology.

FIG. 8 is an exemplary cross-sectional view illustrating the relationship between an optical system and incident light in an image pickup apparatus according to a third embodiment of the present technology. Similarly to the first embodiment, the optical system of the third embodiment includes a first lens 110 having a positive refractive power, a second lens 120 having a negative refractive power, a third lens 130 having a positive refractive power, and a fourth lens 140 having a negative refractive power. Similarly to the first embodiment, the optical system further includes light-shielding members 151 to 153, a lens holder 160, a filter 180, and an image pickup device 190.

As described above, the recess 121 is provided in the outer edge portion of the image-side flange surface 129 of the second lens 120 in the first embodiment, and the recess 122 is provided in the inner edge portion of the image-side flange surface 129 of the second lens 120 in the second embodiment. In the third embodiment, both the recess 121 and the recess 122 are provided. That is, a recess 121 is provided in an outer edge portion of an image-side flange surface 129 of the second lens 120, and a recess 122 is provided in an inner edge portion of the image-side flange surface 129. This structure refracts harmful light beams incident at various angles toward the lens holder 160 and the light-shielding member 152. As a result, it is possible to prevent harmful light beams that may cause a ghost or flare from entering the image pickup device 190.

Structure of Second Lens

Figure 9:
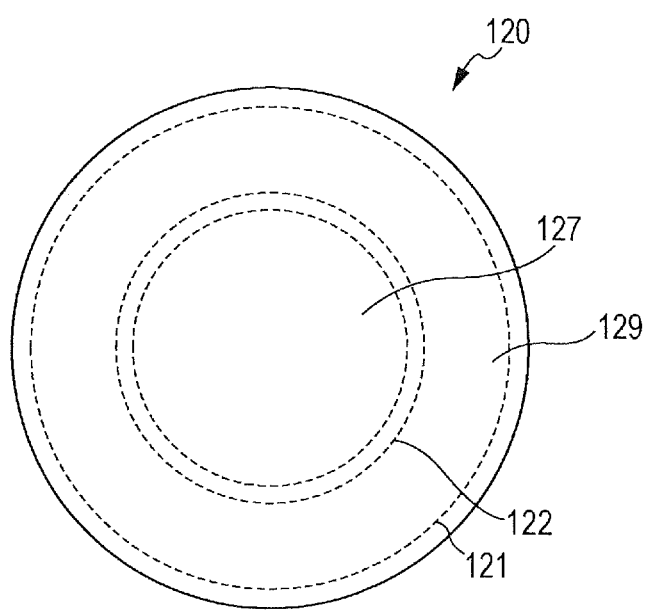
FIG. 9 is an exemplary rear view of a second lens in the third embodiment, as viewed in an optical axis direction from an image side.

FIG. 9 is an exemplary rear view of the second lens 120 in the third embodiment of the present technology, as viewed in the optical axis direction from the image side. The second lens 120 of the third embodiment has the recess 121 provided in the outer edge portion of the image-side flange surface 129 around an image-side effective diameter area 127, and the recess 122 provided in the inner edge portion of the image-side flange surface 129. The recess 121 and the recess 122 are provided along the entire circumferences of concentric circles centered on an optical axis 90 on the image-side flange surface 129.

An area connecting the recess 121 and the recess 122 is a flat surface substantially perpendicular to the optical axis 90. This easily increases the accuracy of the distances between the lenses 110 to 140 when the lenses 110 to 140 are assembled in the lens holder 160.

While the recess 121 and the recess 122 are provided along the entire circumferences of the circles centered on the optical axis 90 in the third embodiment, each of them may be provided only along a part of the corresponding circle centered on the optical axis 90, similarly to the first embodiment. For example, the recess 121 and the recess 122 may be provided along only lower halves of the circles centered on the optical axis 90 in consideration of incidence of a harmful light beam from an upper side to a lower side. Alternatively, one of the recesses 121 and 122 may be provided along the entire circumference of the corresponding circle, and the other may be provided along only a part of the corresponding circle.

The recesses 121 and 122 can have shapes similar to those adopted in the first embodiment illustrated in FIGS. 4A to 4C.

As described above, in the third embodiment of the present technology, the recess 121 is provided in the outer edge portion of the image-side flange surface 129 of the second lens 120 and the recess 122 is provided in the inner edge portion of the image-side flange surface 129. Hence, it is possible to prevent a harmful light beam from entering the image pickup device 190. That is, the third embodiment provides both the advantage of the first embodiment and the advantage of the second embodiment. Even when a light source is provided at any angle to the optical axis 90, a harmful light beam that may cause a ghost or flare can be avoided effectively.

4. Fourth Embodiment

Configuration of Optical System in Image Pickup Apparatus

Figure 10:
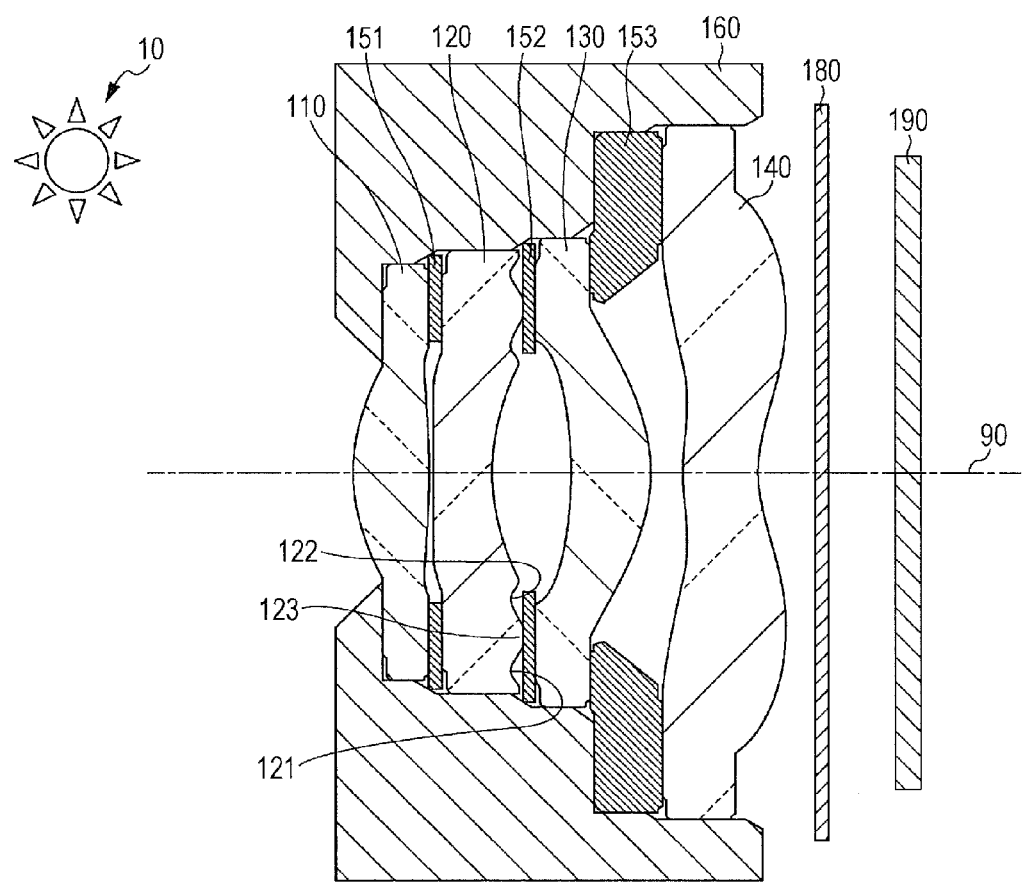
FIG. 10 is an exemplary cross-sectional view illustrating the relationship between an optical system and incident light in an image pickup apparatus according to a fourth embodiment of the present technology.

FIG. 10 is an exemplary cross-sectional view illustrating the relationship between an optical system and incident light in an image pickup apparatus according to a fourth embodiment of the present technology. Similarly to the first embodiment, the optical system of the fourth embodiment includes a first lens 110 having a positive refractive power, a second lens 120 having a negative refractive power, a third lens 130 having a positive refractive power, and a fourth lens 140 having a negative refractive power. Similarly to the first embodiment, the optical system further includes light-shielding members 151 to 153, a lens holder 160, a filter 180, and an image pickup device 190.

In the fourth embodiment, a recess 121 is provided in an outer edge portion of an image-side flange surface 129 of the second lens 120 and a recess 122 is provided in an inner edge portion of the image-side flange surface 129, similarly to the above-described third embodiment. While it is assumed that the area connecting the recess 121 and the recess 122 is a flat surface substantially perpendicular to the optical axis 90 in the above third embodiment, the recess 121 and the recess 122 are connected by a curved face 123 in the fourth embodiment. This ensures wide areas of the slopes in the recesses 121 and 122 in the fourth embodiment.

5. Fifth Embodiment

Configuration of Optical System in Image Pickup Apparatus

Figure 11:
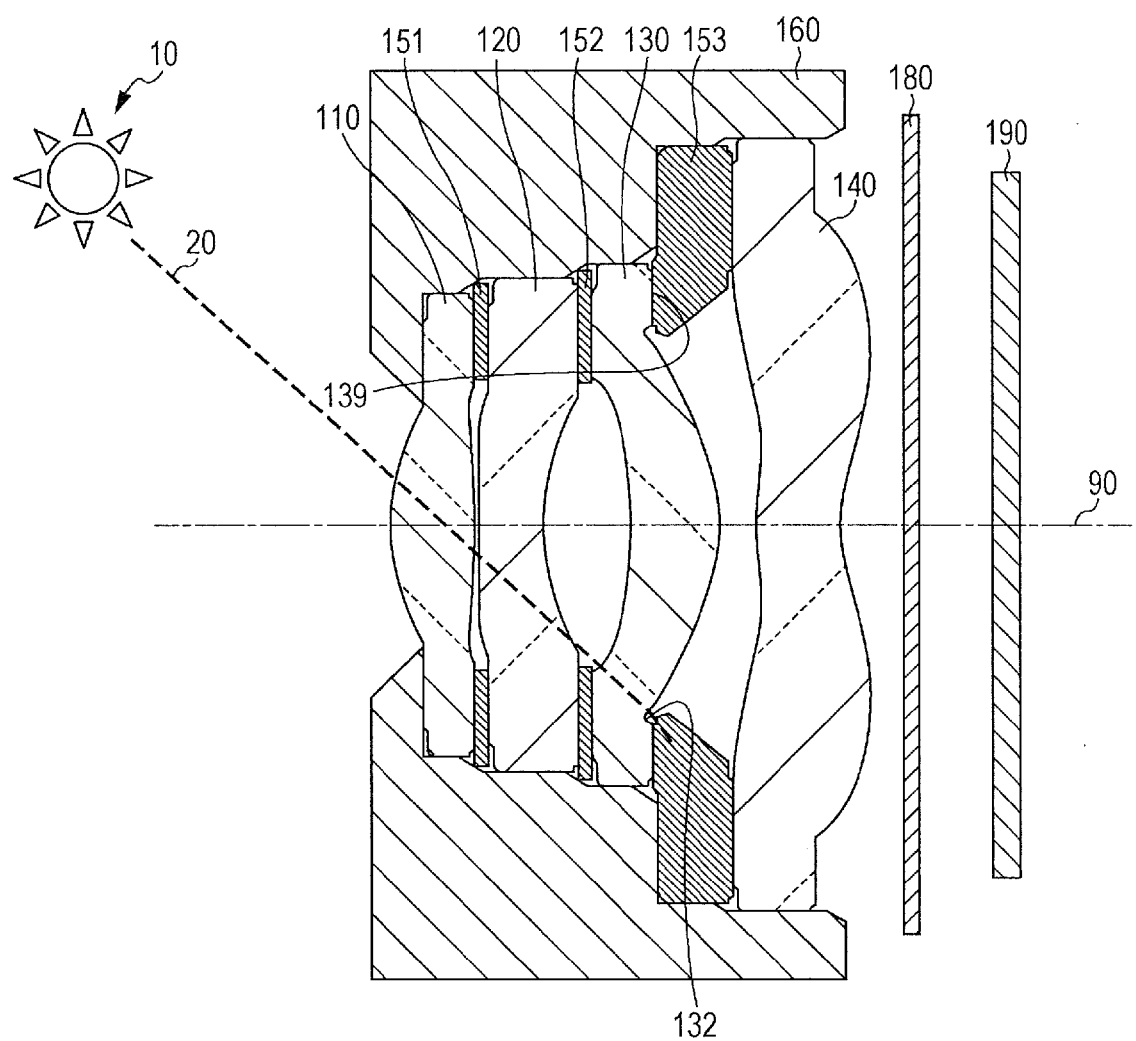
FIG. 11 is an exemplary cross-sectional view illustrating the relationship between an optical system and incident light in an image pickup apparatus according to a fifth embodiment of the present technology.

FIG. 11 is an exemplary cross-sectional view illustrating the relationship between an optical system and incident light in an image pickup apparatus according to a fifth embodiment of the present technology. Similarly to the first embodiment, the optical system of the fifth embodiment includes a first lens 110 having a positive refractive power, a second lens 120 having a negative refractive power, a third lens 130 having a positive refractive power, and a fourth lens 140 having a negative refractive power. Similarly to the first embodiment, the optical system further includes light-shielding members 151 to 153, a lens holder 160, a filter 180, and an image pickup device 190.

While the recess is provided in the outer edge portion of the image-side flange surface 129 of the second lens 120 in the above-described first to fourth embodiments, a recess 132 is provided in an inner edge portion of an image-side flange surface 139 of the third lens 130 in the fifth embodiment. The recess 132 diffracts a light beam incident on the inner edge portion of the image-side flange surface 139 toward the light-shielding member 153 without reflection. As a result, it is possible to prevent a harmful light beam that may cause a ghost or flare from entering the image pickup device 190.

The recess 132 in the inner edge portion of the image-side flange surface 139 of the third lens 130 can be provided along the entire circumference of a circle centered on an optical axis 90, similarly to the second embodiment illustrated in FIG. 7. However, similarly to the other embodiments, the recess 132 may be provided along only a part of the circle centered on the optical axis 90. For example, the recess 132 may be provided along only a lower half of the circle centered on the optical axis 90, in consideration of incidence of a harmful light beam from an upper side to a lower side.

The recess 132 can have shapes similar to those of the recess 121 in the first embodiment illustrated in FIGS. 4A to 4C.

In this way, in the fifth embodiment of the present technology, the recess 132 is provided in the inner edge portion of the image-side flange surface 139 of the third lens 130. Hence, a harmful light beam that may cause a ghost or flare can be prevented from entering the image pickup device 190.

6. Modifications

While the recess is provided in the image-side surface of the flange portion of the second or third lens to prevent incidence of a harmful light beam on the image pickup device 190 in the above-described embodiments, the recess serving such a function may be provided in the object-side surface instead of the image-side surface. Alternatively, such a recess may be provided in the first or fourth lens.

Figure 12:
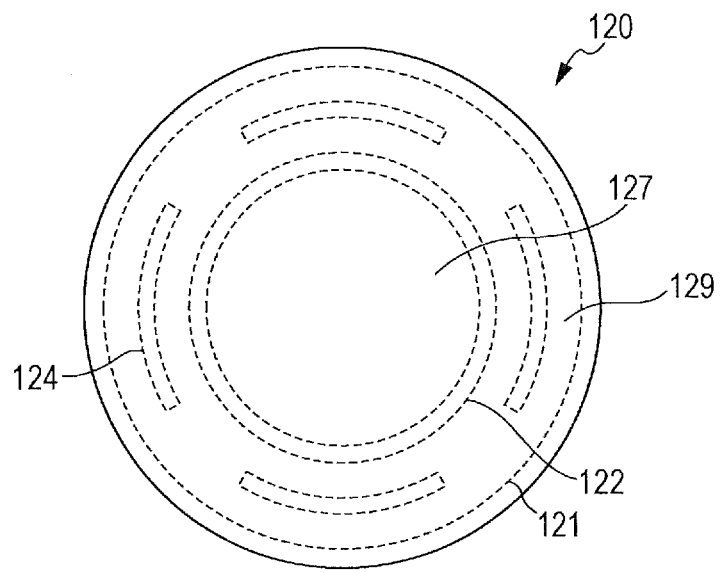
FIG. 12 is an exemplary rear view of a second lens in a first modification of the embodiment of the present technology, as viewed in an optical axis direction from an image side.
Figure 13:
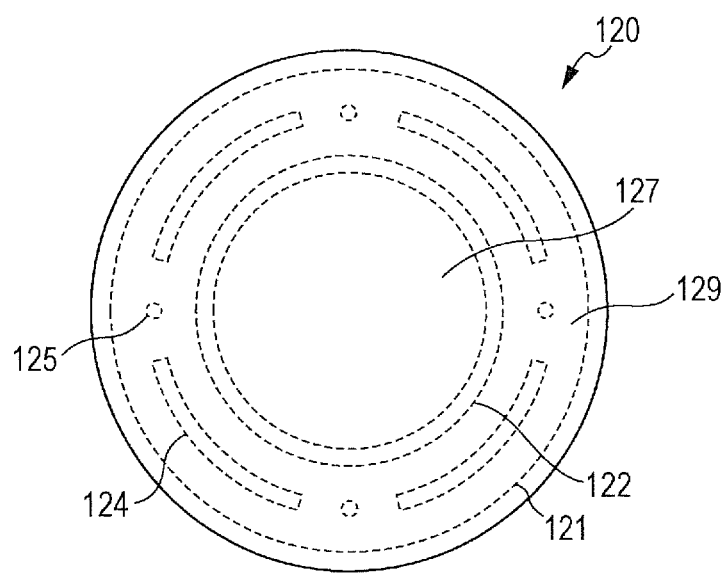
FIG. 13 is an exemplary rear view of a second lens in a second modification of the embodiment of the present technology, as viewed in an optical axis direction from an image side.

While it is assumed in the first to third and fifth embodiments, the portion of the flange surface of the lens other than the recess 121 and so on is a flat surface, the portion may be undulated to an extent such as not to hinder fixing of the lens. For example, as illustrated in FIG. 12, recesses 124 may be provided in the flange surface. In FIG. 12, an area of the flange surface other than the recesses 124 supports the lens. For example, as illustrated in FIG. 13, projections 125 may be provided further. In FIG. 13, the recesses 125 mainly support the lens.

While the optical system has a four-lens structure including the first lens having a positive refractive power, the second lens having a negative refractive power, a third lens having a positive refractive power, and the fourth lens having a negative refractive power in the above-described embodiments, the present technology is not limited thereto. For example, the present technology can be similarly applied to a fifth-lens structure including a first lens having a positive refractive power, a second lens having a negative refractive power, a third lens having a positive refractive power, a fourth lens having a positive refractive power, and a fifth lens having a negative refractive power.

It should be noted that the above-described embodiments of the present technology illustrate examples for embodying the present technology. The matters in the embodiments have a respective correspondence with the matters for defining the claimed technology. Similarly, the matters for defining the claimed technology have a respective correspondence with the similarly-named matters in the embodiments of the present technology. However, it should be noted that the present technology is not limited to the embodiments, and that the present technology may be embodied by performing various modifications without departing from the scope and spirit of the present technology.

The present technology can also include the following embodiments:

(1) An optical element including: an effective diameter area that is centered on an optical axis and transmits an effective light beam; and a flange portion having, on a side surface around the effective diameter area, a slope that is not perpendicular to a direction of the optical axis.

(2) The optical element according to the above embodiment (1), wherein the side surface on which the slope is provided is an image-side surface of the flange portion.

(3) The optical element according to the above embodiment (1) or (2), wherein the slope is provided in an inner edge portion or an outer edge portion of the side surface of the flange portion.

(4) The optical element according to any of the above embodiments (1) to (3), wherein the slope is provided in both an inner edge portion and an outer edge portion of the side surface of the flange portion.

(5) The optical element according to any of the above embodiments (1) to (4), wherein the slope includes recesses provided in both an inner edge portion and an outer edge portion of the side surface of the flange portion, and an area connecting the recesses in the inner edge portion and the outer edge portion is a flat surface substantially perpendicular to the optical axis.

(6) The optical element according to any of the above embodiments (1) to (5), wherein the slope is provided along the entirety or a part of a circumference of a circle centered on the optical axis on the side surface of the flange portion.

(7) An imaging lens unit including in order from an object side: a first lens having a positive refractive power; a second lens having a negative refractive power; a third lens having a positive refractive power; and a fourth lens having a negative refractive power, wherein the second lens or the third lens has an effective diameter area that is centered on an optical axis and transmits an effective light beam, and a flange portion having, on a side surface around the effective diameter area, a slope that is not perpendicular to a direction of the optical axis.

(8) The imaging lens unit according to the above embodiment (7), further including a lens that does substantially not have a lens power.

(9) An imaging lens unit including in order from an object side: a first lens having a positive refractive power; a second lens having a negative refractive power; a third lens having a positive refractive power; a fourth lens having a positive refractive power; and a fifth lens having a negative refractive power, wherein the second lens or the third lens has an effective diameter area that is centered on an optical axis and transmits an effective light beam, and a flange portion having, on a side surface around the effective diameter area, a slope that is not perpendicular to a direction of the optical axis.

(10) The imaging lens unit according to the above embodiment (9), further including a lens that does substantially not have a lens power.

(11) An image pickup apparatus including: an imaging lens unit including, in order from an object side, a first lens having a positive refractive power, a second lens having a negative refractive power, a third lens having a positive refractive power, and a fourth lens having a negative refractive power, and an image pickup device that converts an optical image formed by the imaging lens unit into an electrical signal, wherein the second lens or the third lens has an effective diameter area that is centered on an optical axis and transmits an effective light beam, and a flange portion having, on a side surface around the effective diameter area, a slope that is not perpendicular to a direction of the optical axis.

(12) The image pickup apparatus according to the above embodiment (11), wherein the imaging lens unit further includes a lens that does substantially not have a lens power.

The present disclosure contains subject matter related to that disclosed in Japanese Priority Patent Application JP 2011-208346 filed in the Japan Patent Office on Sep. 26, 2011, the entire contents of which are hereby incorporated by reference.

What is claimed is:

1. An optical unit comprising in order from an object side:
a first optical element and a second optical element,
wherein the first optical element includes:
   an effective diameter area that is centered on an optical axis and transmits an effective light beam; and
   a flange portion extending substantially perpendicular to a direction of the optical axis and including an image-side flange surface which is perpendicular to the direction of the optical axis, the image-side flange surface having a circumferential recess, extending along at least a portion of a circumference of a circle centered around the optical axis,
wherein a light beam incident on the image-side flange surface is refracted by the circumferential recess towards a light-shielding member disposed between flange portions of the first optical element and the second optical element, and
wherein the circumferential recess has a slope on a sidewall thereof.

2. The optical unit according to claim 1, wherein the image-side flange surface is provided on a surface of the first optical element which faces an image.

3. The optical unit according to claim 1, wherein the slope is provided in an inner edge portion or an outer edge portion of the circumferential recess.

4. The optical unit according to claim 3, wherein the slope is provided in both the inner edge portion and the outer edge portion of the circumferential recess.

5. The optical unit according to claim 4,
wherein the slope includes recesses provided in the inner edge portion and the outer edge portion of the circumferential recess, and
wherein an area connecting the recesses in the inner edge portion and the outer edge portion is a flat surface substantially perpendicular to the optical axis.

6. The optical unit according to claim 1, wherein the slope is provided along the entirety or a part of a circumference of a circle centered on the optical axis on the image-side flange surface.

7. An imaging lens unit comprising in order from an object side:
a first lens having a positive refractive power;
a second lens having a negative refractive power;
a third lens having a positive refractive power; and
a fourth lens having a negative refractive power,
wherein the second lens or the third lens has an effective diameter area that is centered on an optical axis and transmits an effective light beam, and a flange portion extending substantially perpendicular to a direction of the optical axis and including an image-side flange surface which is perpendicular to the direction of the optical axis, the image-side flange surface having a circumferential recess extending along at least a portion of a circumference of a circle centered around the optical axis,
wherein a light beam incident on the image-side flange surface is refracted by the circumferential recess towards a light-shielding member disposed between flange portions of the second lens or the third lens and a lens that is adjacent to the second lens or the third lens on an image-side, and
wherein the circumferential recess has a slope on a sidewall thereof.

8. An imaging lens unit comprising in order from an object side:
a first lens having a positive refractive power;
a second lens having a negative refractive power;
a third lens having a positive refractive power;
a fourth lens having a positive refractive power; and
a fifth lens having a negative refractive power,
wherein the second lens or the third lens has an effective diameter area that is centered on an optical axis and transmits an effective light beam, and a flange portion extending substantially perpendicular to a direction of the optical axis and including an image-side flange surface which is perpendicular to the direction of the optical axis, the image-side flange surface having a circumferential recess extending along at least a portion of a circumference of a circle centered around the optical axis,
wherein a light beam incident on the image-side flange surface is refracted by the circumferential recess towards a light-shielding member disposed between flange portions of the second lens or the third lens and a lens that is adjacent to the second lens or the third lens on an image-side, and
wherein the circumferential recess has a slope on a sidewall thereof.

9. An image pickup apparatus comprising:
an imaging lens unit including, in order from an object side, a first lens having a positive refractive power, a second lens having a negative refractive power, a third lens having a positive refractive power, and a fourth lens having a negative refractive power; and
an image pickup device that converts an optical image formed by the imaging lens unit into an electrical signal,
wherein the second lens or the third lens has an effective diameter area that is centered on an optical axis and transmits an effective light beam, and a flange portion extending substantially perpendicular to a direction of the optical axis and including an image-side flange surface which is perpendicular to the direction of the optical axis, the image-side flange surface having a circumferential recess extending along at least a portion of a circumference of a circle centered around the optical axis,
wherein a light beam incident on the image-side flange surface is refracted by the circumferential recess towards a light-shielding member disposed between flange portions of the second lens or the third lens and a lens that is adjacent to the second lens or the third lens on an image-side, and
wherein the circumferential recess has a slope on a sidewall thereof.

10. The optical unit according to claim 1, wherein the image-side flange surface further includes a second circumferential recess.

11. The optical unit according to claim 1, wherein the image-side flange surface further includes at least one projection disposed along at least a portion of the circumference of the circle centered around the optical axis.

12. The image pickup apparatus according to claim 9, wherein the image-side flange surface is provided on a surface of an optical element which faces an image.

13. The image pickup apparatus according to claim 9, wherein the slope is provided in an inner edge portion or an outer edge portion of the circumferential recess.

14. The image pickup apparatus according to claim 13, wherein the slope is provided in both the inner edge portion and the outer edge portion of the circumferential recess.

15. The image pickup apparatus according to claim 14,
wherein the slope includes recesses provided in the inner edge portion and the outer edge portion of the circumferential recess, and
wherein an area connecting the recesses in the inner edge portion and the outer edge portion is a flat surface substantially perpendicular to the optical axis.

16. The image pickup apparatus according to claim 9, wherein the slope is provided along the entirety or a part of a circumference of a circle centered on the optical axis on the side surface of the flange portion.

17. The image pickup apparatus according to claim 9, wherein the image-side flange surface further includes a second circumferential recess.

18. The image pickup apparatus according to claim 9, wherein the image-side flange surface further includes at least one projection disposed along at least a portion of the circumference of the circle centered around the optical axis.

* * * * *